(12) United States Patent
Furusawa et al.

(10) Patent No.: US 10,473,104 B2
(45) Date of Patent: Nov. 12, 2019

(54) WATER PUMP AND METHOD FOR MANUFACTURING WATER PUMP

(71) Applicants: HITACHI AUTOMOTIVE SYSTEMS, LTD., Hitachinaka-shi, Ibaraki (JP); SUMITOMO BAKELITE CO., LTD., Tokyo (JP)

(72) Inventors: Yusuke Furusawa, Novi, MI (US); Hideaki Nakamura, Yokohama (JP); Hisanori Sakuma, Atsugi (JP); Shu Okasaka, Shinagawa (JP)

(73) Assignees: HITACHI AUTOMOTIVE SYSTEMS, LTD., Ibaraki (JP); SUMITOMO BAKELITE CO., LTD., Tokyo (JP)

( * ) Notice: Subject to any disclaimer, the term of this patent is extended or adjusted under 35 U.S.C. 154(b) by 364 days.

(21) Appl. No.: 15/501,251

(22) PCT Filed: Jun. 29, 2015

(86) PCT No.: PCT/JP2015/068679
§ 371 (c)(1),
(2) Date: Feb. 2, 2017

(87) PCT Pub. No.: WO2016/021331
PCT Pub. Date: Feb. 11, 2016

(65) Prior Publication Data
US 2017/0218960 A1    Aug. 3, 2017

(30) Foreign Application Priority Data
Aug. 5, 2014 (JP) ................. 2014-159125

(51) Int. Cl.
*F04D 13/02*    (2006.01)
*B29C 45/56*    (2006.01)
(Continued)

(52) U.S. Cl.
CPC .............. *F04D 13/02* (2013.01); *B29C 45/26* (2013.01); *B29C 45/5675* (2013.01);
(Continued)

(58) Field of Classification Search
CPC .... F04D 29/026; F04D 29/043; F04D 29/126; F04D 29/106; F04D 13/00–16
See application file for complete search history.

(56) References Cited

U.S. PATENT DOCUMENTS 5,026,253 A    6/1991  Börger
5,482,669 A *  1/1996  Shah .................. B29C 45/0025
                                                      264/40.3
(Continued)

FOREIGN PATENT DOCUMENTS

JP    03159713 A *  7/1991  ......... B29C 45/0013
JP    H06-262648 A   9/1994
(Continued)

*Primary Examiner* — Igor Kershteyn
*Assistant Examiner* — John S Hunter, Jr.
(74) *Attorney, Agent, or Firm* — Foley & Lardner LLP

(57) ABSTRACT

A water pump has a pump housing (2) having therein a pump chamber (3); a drive shaft (7) rotatably supported in the pump housing (2); a pulley (5) having a flange wall (5*a*) fixed to one end portion of the drive shaft (7), the pulley (5) being formed integrally with the drive shaft (7) with synthetic resin material containing glass fiber material (25); and an impeller (8) secured to the other end portion of the drive shaft (7) so as to be able to rotate integrally with the drive shaft (7), the impeller (8) being accommodated in the pump chamber (3). Six penetration holes (23) are formed at the flange wall (5*a*), and the glass fiber material (25) existing around the penetration hole (23) is oriented at random. With this, decrease in strength of the pulley (5) can be suppressed.

18 Claims, 15 Drawing Sheets

(51) Int. Cl.
- *F04D 29/02* (2006.01)
- *F04D 29/043* (2006.01)
- *F16H 55/36* (2006.01)
- *B29C 45/26* (2006.01)
- *F16H 55/40* (2006.01)
- *F04D 29/049* (2006.01)

(52) U.S. Cl.
CPC ......... *F04D 29/026* (2013.01); *F04D 29/043* (2013.01); *F16H 55/36* (2013.01); *F16H 55/40* (2013.01); *F04D 29/02* (2013.01); *F04D 29/049* (2013.01); *F05D 2300/6034* (2013.01)

(56) References Cited

U.S. PATENT DOCUMENTS

| | | | |
|---|---|---|---|
| 6,764,278 B2 * | 7/2004 | Ozawa | F04D 29/026 415/124.2 |
| 6,960,066 B2 * | 11/2005 | Koga | F04D 29/049 417/362 |
| 9,611,858 B2 * | 4/2017 | Furusawa | F04D 13/02 |
| 2002/0176773 A1 | 11/2002 | Ozawa et al. | |
| 2003/0175133 A1 | 9/2003 | Koga et al. | |
| 2014/0064931 A1 | 3/2014 | Furusawa | |

FOREIGN PATENT DOCUMENTS

| JP | 2002-349481 A | 12/2002 |
|---|---|---|
| JP | 2012-112341 A | 6/2012 |

* cited by examiner

WATER PUMP AND METHOD FOR MANUFACTURING WATER PUMP

TECHNICAL FIELD

The present invention relates to a water pump applied to, for instance, an engine cooling device of a vehicle and circulating cooling water in the cooling device, and relates to a method for manufacturing the water pump.

BACKGROUND ART

As a water pump in related arts, a water pump disclosed in the following Patent Document 1 has been known.

When briefly explaining the water pump, the water pump has a pump housing having therein a pump chamber, a synthetic resin made-drive shaft rotatably supported in the pump chamber, a synthetic resin-made pulley integrally connected to one end portion of the drive shaft through a flange wall, a ball bearing provided on an inner circumferential side of the pulley through a cylindrical metal-made insert and supporting the drive shaft, an impeller provided at the other end portion of the drive shaft so as to be able to rotate integrally with the drive shaft, and a mechanical seal interposed between the impeller and the pulley.

Further, a plurality of penetration holes are provided at regular intervals in a circumferential direction on the flange wall of the pulley. Each penetration hole has the function of inserting a jig for press-fitting an outer ring of the ball bearing onto an inner circumferential surface of the pulley upon assembly of components, and also has the function of draining water, which leaks from the mechanical seal in the pump housing, to the outside.

In addition, the synthetic resin material forming the pulley and the drive shaft contains reinforcing glass fiber material, then strength of the pulley and the drive shaft is increased.

CITATION LIST

Patent Document

Patent Document 1: Japanese Unexamined Patent Publication No. JP2014-043848

SUMMARY OF THE INVENTION

As a molding method of the penetration holes, the following method is generally used; cores having the same shape as the penetration holes are previously arranged in position corresponding to the flange wall in an injection-molding mold, and by filling the injection-molding mold with the synthetic resin material from a middle position of the flange wall toward a radial direction, each penetration hole is formed simultaneously with the filling of the synthetic resin material.

However, the fiber material existing around the penetration hole of the flange wall of the pulley formed by this method is oriented almost uniformly along the radial direction of the flange wall. In particular, a so-called weld line is generated at an outer radial side of the flange wall with respect to the penetration hole when the synthetic resin material having flown separately to outer peripheral both sides of the core joins. Because of this, there is a risk of decreasing the strength of the pulley.

The present invention was made in view of the above technical problem of the related art water pump. An object of the present invention is therefore to provide a water pump that is capable of suppressing the decrease in the strength of the pulley by arranging, at random, the fiber material existing around the penetration hole.

In the present invention, a water pump comprises: a pump housing having therein a pump chamber; a drive shaft rotatably supported in the pump housing; a pulley having a disk-shaped flange wall fixed to one end portion of the drive shaft, the pulley being formed integrally with the drive shaft with synthetic resin material containing reinforcing fiber material; and an impeller secured to the other end portion of the drive shaft so as to be able to rotate integrally with the drive shaft, the impeller being accommodated in the pump chamber. And, the flange wall of the pulley has a plurality of penetration holes that connect inner and outer sides of the flange wall, and the reinforcing fiber material existing around the penetration hole has random orientation.

According to the present invention, by arranging, at random, the fiber material existing around the penetration hole, the decrease in the strength of the pulley can be suppressed.

BRIEF DESCRIPTION OF THE DRAWINGS

FIG. 7A is a longitudinal cross section of a mold, showing a state before the mold is filled with the resin material. FIG. 7B is a longitudinal cross section of the mold, showing a state after a first process. FIG. 7C is a longitudinal cross section of the mold, showing a state after a second process.

FIG. 8A is a longitudinal cross section of the mold, showing a state in which press pins (or push-out pins) moved in the second process is returned to an original position. FIG. 8B is a longitudinal cross section of the mold, showing a state in which the mold is opened. FIG. 8C is a longitudinal cross section of the pulley and the drive shaft taken out of the mold.

FIG. 11A is a front view of the pulley. FIG. 11B is a perspective view of the pulley with an essential part of the pulley longitudinally cut.

FIG. 12A is a front view of the pulley. FIG. 12B is a perspective view of the pulley with an essential part of the pulley longitudinally cut.

FIG. 13A is a front view of the pulley. FIG. 13B is a perspective view of the pulley with an essential part of the pulley longitudinally cut.

EMBODIMENTS FOR CARRYING OUT THE INVENTION

First Embodiment

Embodiments of a water pump according to the present invention will be explained below with reference to the drawings. This water pump 1 is applied to a cooling device to circulate antifreeze (ethylene glycol), which is cooling water, between a radiator and an internal combustion engine of a vehicle.

Figure 1:
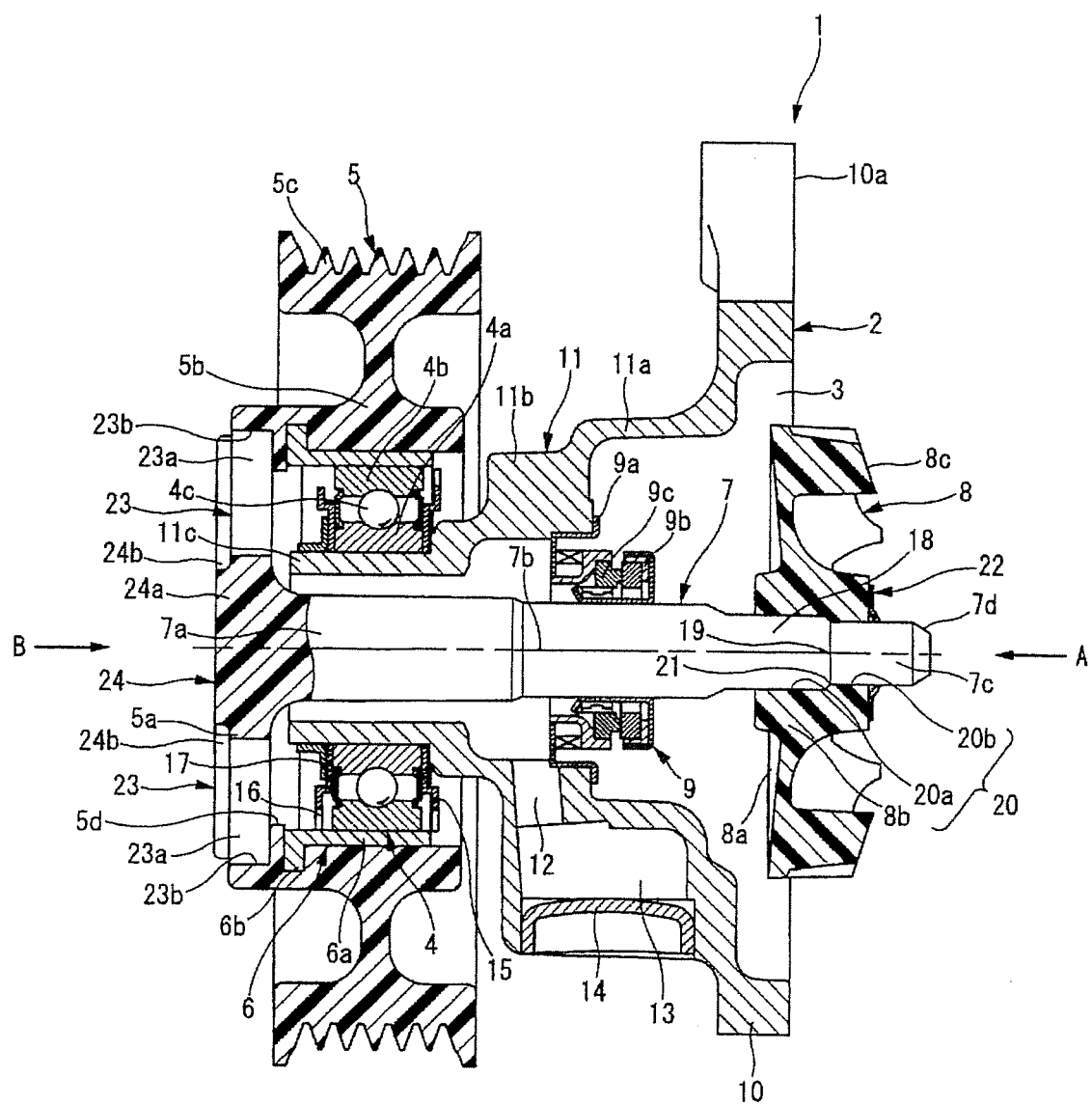
FIG. 1 is a longitudinal cross section of a water pump according to a first embodiment of the present invention.
Figure 2:
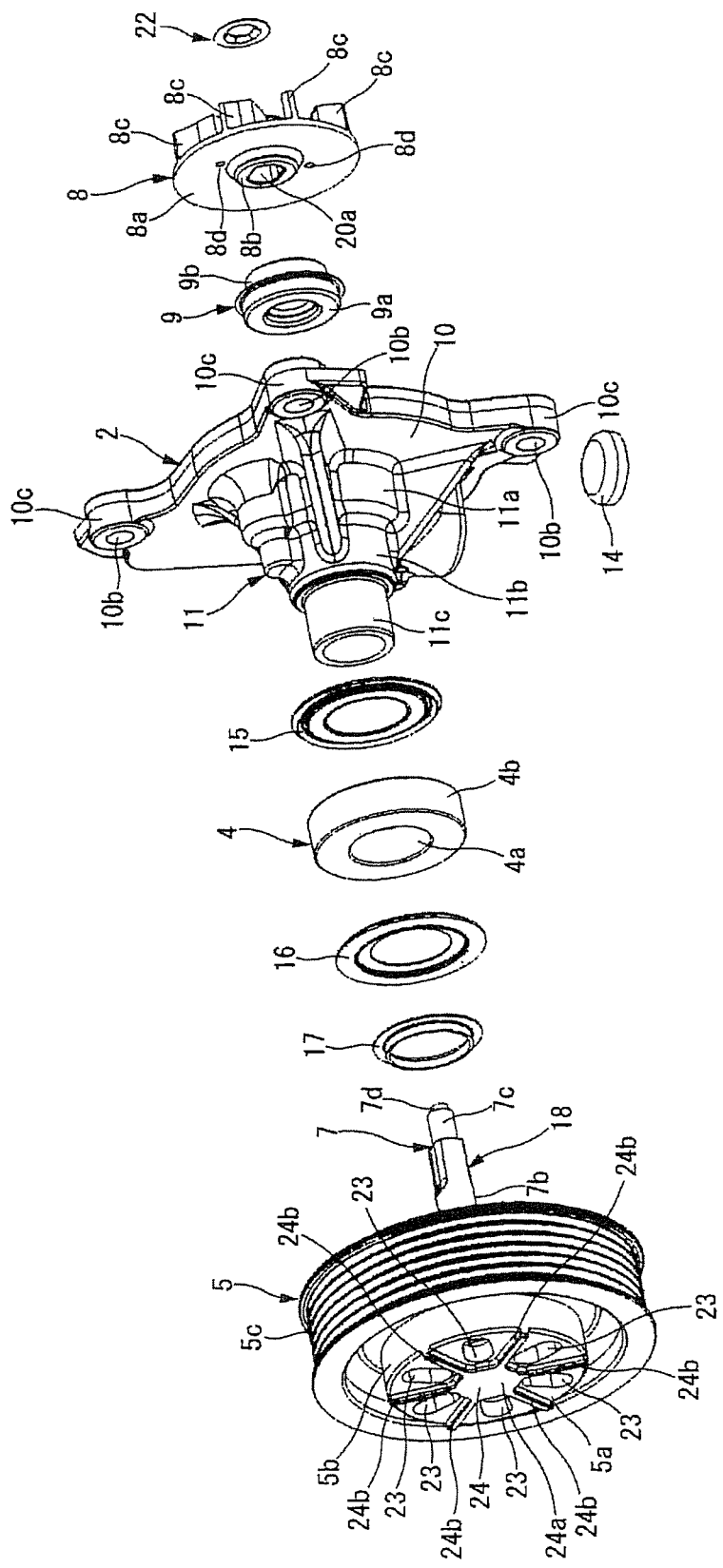
FIG. 2 is a perspective exploded view of the water pump according to the first embodiment.

As shown in FIGS. 1 and 2, the water pump 1 is formed mainly by a pump housing 2 directly secured to a side portion of a cylinder block (not shown) of an internal combustion engine (not shown) with bolts and having a pump chamber 3 at a front end portion, on a cylinder block side, of the pump housing 2, a pulley 5 rotatably supported by a single-unit ball bearing 4, which is a bearing unit, on a rear end side of the pump housing 2, a metal-made cylindrical insert 6 interposed between the pulley 5 and the ball bearing 4, a drive shaft 7 which is inserted and located in an inside of the pump housing 2 and whose one end side is formed integrally with the pulley 5, an impeller 8 secured to the other end side of the drive shaft 7 and rotatably accommodated in the pump chamber 3, and a mechanical seal 9 interposed between the pump housing 2 and the drive shaft 7 and sealing a gap between the pump chamber 3 and the ball bearing 4.

The pump housing 2 is formed as a single unit with aluminium alloy material. A housing body 10, on a pump chamber 3 side, of the pump housing 2 has an irregular annular shape. The pump housing 2 has a stepped cylindrical portion 11 on a rear end side of the housing body 10.

The housing body 10 has, at a front end thereof, a ring-shaped flat mounting surface 10a that contacts a flat surface area of a side portion of the cylinder block. The housing body 10 also has, at an outer periphery thereof, a plurality boss portions 10c each having a bolt hole 10b into which a fixing bolt screwed into and fixed to the cylinder block is inserted.

Further, the housing body 10 has, in an inside thereof, an outlet port 10d that discharges the cooling water, which flows into the pump chamber 3 from an inlet port, on a radiator (not shown) side, of the housing body (the pump housing 2), to an inside of a water jacket in the cylinder block by and according to rotation of the impeller 8.

The cylindrical portion 11 is formed, as shown in FIGS. 1 and 2, from a large diameter cylindrical portion 11a on a pump chamber 3 side, a middle diameter cylindrical portion 11b extending from the large diameter cylindrical portion 11a toward the ball bearing 4 and a small diameter cylindrical portion 11c extending from the middle diameter cylindrical portion 11b to one end side of the drive shaft 7.

The middle diameter cylindrical portion 11b is provided, as shown in FIGS. 1 and 2, on a lower side in a gravity direction, with a drain hole 12 penetrating the middle diameter cylindrical portion 11b in an up-and-down direction in order for drop of the cooling water leaking from the mechanical seal 9 to fall into the drain hole 12. The middle diameter cylindrical portion 11b is also provided, on a lower side of the drain hole 12, with a drain chamber 13 extending to an inside of the large diameter cylindrical portion 11a and collecting and storing the drop of the cooling water from the drain hole 12. A lower end opening of this drain chamber 13 is liquid-tightly sealed by a drain cap 14.

The ball bearing 4 is a common bearing. As shown in FIGS. 1 and 2, the ball bearing 4 has an inner ring 4a press-fitted into the small diameter cylindrical portion 11c, an outer ring 4b press-fitted into the insert 6 and a plurality of balls 4c rollably provided between the inner ring 4a and the outer ring 4b through a holder.

A maximum press-fit position of the inner ring 4a in its axial direction is restricted by a rear end surface of the middle diameter cylindrical portion 11b of the cylindrical portion 11. On the other hand, an axial direction position of the outer ring 4b is previously set by a press-fit length into the insert 6.

As shown in FIGS. 1 and 2, the ball bearing 4 is provided, at front and rear ends thereof in the axial direction, a pair of first and second seal members 15 and 16 to prevent entry of dust into an inside of the ball bearing 4. Both of the seal members 15 and 16 have a substantially ring-shape, and are oppositely disposed so as to cover the axial direction both sides of the ball bearing 4.

The first seal member 15 is fixed with the first seal member 15 sandwiched between the middle diameter cylindrical portion 11b and one end surface of the inner ring 4a. The second seal member 16 is fixed by a retainer 17 that is a retaining member with the second seal member 16 sandwiched between the retainer 17 and the other end surface of the inner ring 4a.

Figure 5:
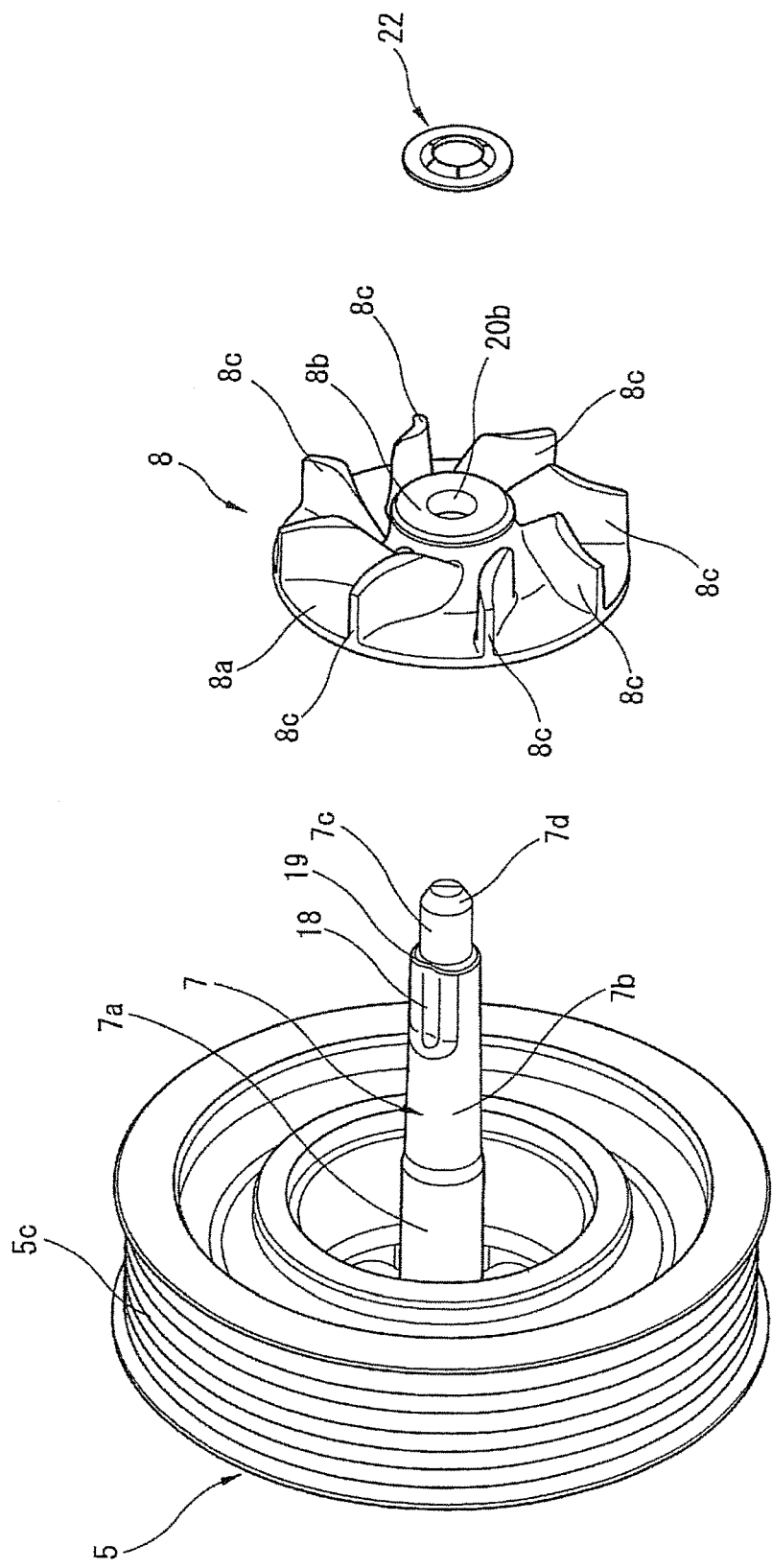
FIG. 5 is a perspective exploded view of the impeller and a drive shaft of the first embodiment.

As shown in FIGS. 1, 2 and 5, the pulley 5 is molded integrally with the drive shaft 7 with synthetic resin material containing an after-mentioned glass fiber 25. The pulley 5 has a flange wall 5a that is a disk-shaped end wall extending from the one end side of the drive shaft 7 in a radial direction, a large diameter cylindrical base portion 5b bending from an outer peripheral edge of the flange wall 5a in an axial direction of the drive shaft 7 and a belt attaching portion 5c provided on an outer circumferential surface of the cylindrical base portion 5b.

As shown in FIG. 1, the cylindrical base portion 5b is provided, on an inner circumferential side thereof, with the above mentioned metal-made cylindrical insert 6. This insert 6 has a cylindrical body 6a and a flange portion 6b formed integrally with a top end of the body 6a. The insert 6 is fixedly connected to the pulley 5 with the flange portion 6b embedded in the cylindrical base portion 5b upon resin-molding of the pulley 5.

The belt attaching portion 5c is configured so that a rotation force is transmitted to a wave-toothed outer periphery of the belt attaching portion 5c via a transmission belt that is wound around a drive pulley (not shown) fixed to a top end portion of a crankshaft (not shown).

As shown in FIGS. 1, 2 and 5, the drive shaft 7 is formed into a cylindrical column having a stepped shape with synthetic resin material containing the after-mentioned glass fiber 25. The drive shaft 7 has a large diameter shaft portion 7a, as one end portion of the drive shaft 7, which is molded integrally with a middle of the flange wall 5a of the pulley 5 along the axial direction, a middle diameter shaft portion 7b, as the other end portion of the drive shaft 7, which extends from the other end of the large diameter shaft portion 7a in the axial direction, and a small diameter shaft portion 7c, also as the other end portion of the drive shaft 7, which extends from the other end of the middle diameter shaft portion 7b in the axial direction.

Further, the drive shaft 7 is shaped into a tapered shape whose diameter becomes smaller gradually or step by step from the large diameter shaft portion 7a toward a tip end of the small diameter shaft portion 7c. That is, the drive shaft 7 is formed to take account of draft when being pulled out of a mold after injection molding while ensuring rigidity of the large diameter shaft portion 7a that is a connecting portion with the pulley 5.

An outer peripheral surface of the middle diameter shaft portion 7b from a substantially axial direction middle position to an end edge, on a small diameter shaft portion 7c side, of the middle diameter shaft portion 7b has a cocoon-shaped portion 18 having a substantially cocoon shape in cross section. The impeller 8 is fitted onto the drive shaft 7 so as to range from the cocoon-shaped portion 18 to the small diameter shaft portion 7c through an after-mentioned fitting hole 20.

The small diameter shaft portion 7c serves as a guide portion when assembling the impeller 8. The small diameter shaft portion 7c is formed so that the tip end portion of the small diameter shaft portion 7c protrudes from a front end side of the impeller 8. An outer peripheral surface 7d of this tip end portion is formed into a tapered shape in order to facilitate the assembly of the impeller 8.

A ring-shaped first stepped portion 19 is provided at a connecting portion between the cocoon-shaped portion 18 of the middle diameter shaft portion 7b and the small diameter shaft portion 7c.

The impeller 8 is formed as a single unit with synthetic resin material. As shown in FIGS. 1 to 5 and 6, the impeller 8 has a substantially disk-shaped base portion 8a, a tubular shaft portion 8b protruding in front and rear directions from a middle of the base portion 8a and eight vane portions 8c formed radially from an outer circumferential surface of the tubular shaft portion 8b on a front surface side of the base portion 8a.

Figure 3:
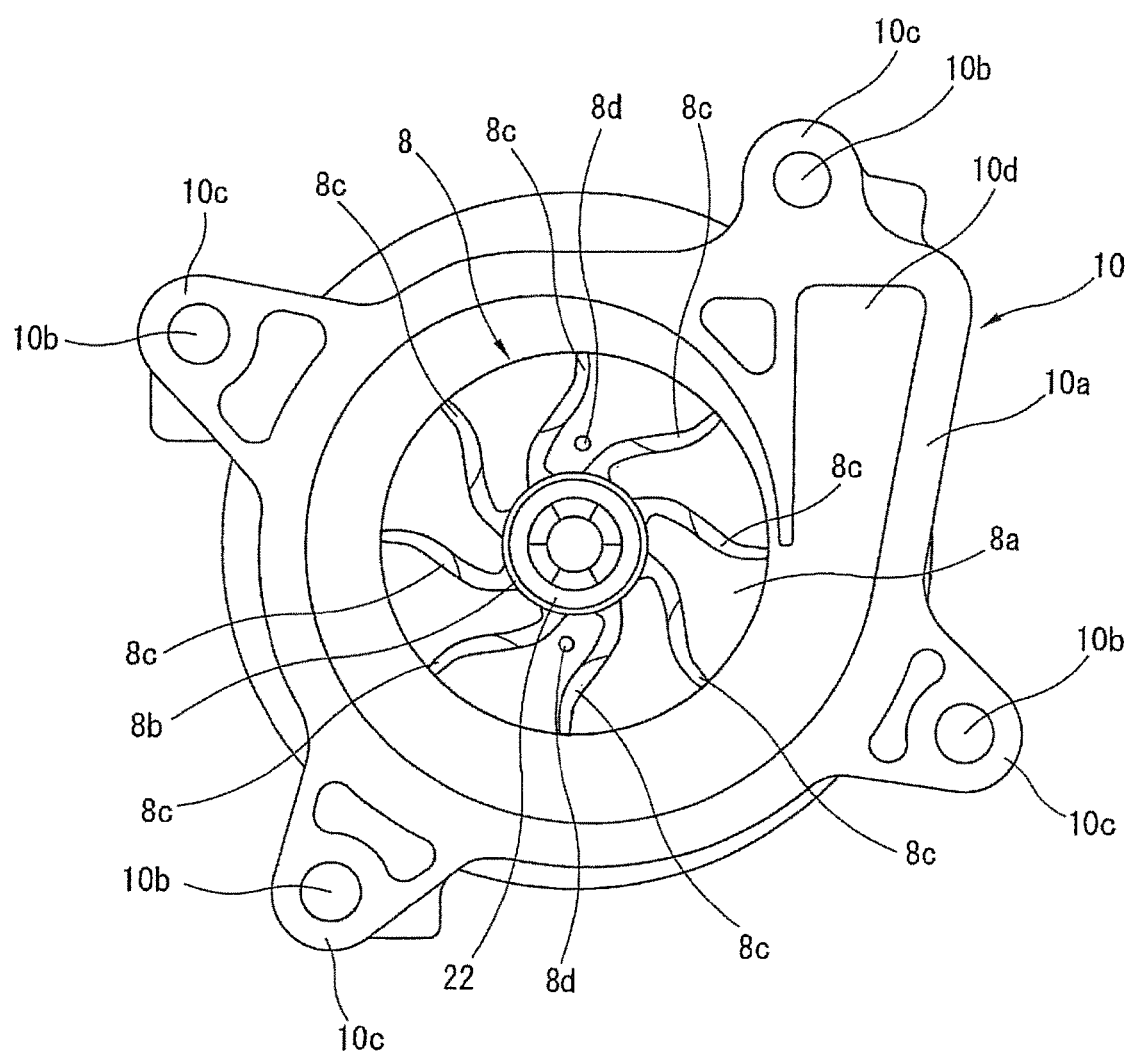
FIG. 3 is a drawing viewed from an arrow A of FIG. 1.
Figure 4:
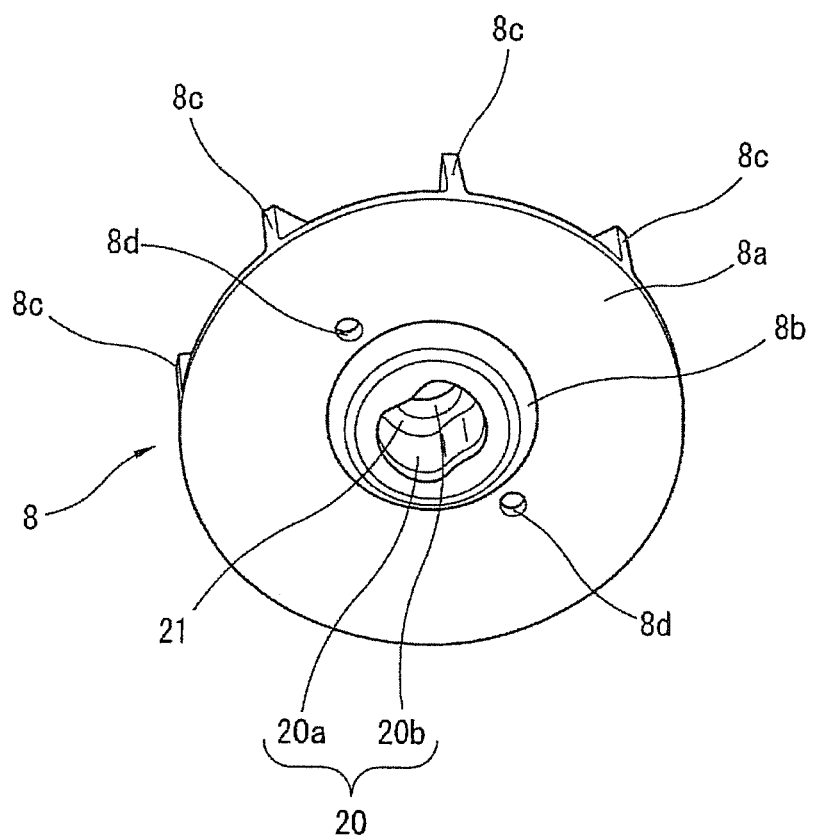
FIG. 4 is a perspective view of aback surface of an impeller of the first embodiment.

The base portion 8a has a predetermined thickness, and a back surface of the base portion 8a faces the pump chamber 3. As shown in FIGS. 2 to 4, the base portion 8a is provided, in 180° positions in a circumferential direction also substantially radially middle positions on the back surface thereof, with a pair of small diameter penetration holes 8d. The cooling water flows to the back surface of the base portion 8a through the small diameter penetration holes 8d, thereby cooling the mechanical seal 9 and suppressing burn due to slide friction between the mechanical seal 9 and the drive shaft 7.

The tubular shaft portion 8b has the fitting hole which penetrates the tubular shaft portion 8b in the axial direction and into which the other end portion of the drive shaft 7 is inserted and fitted. The fitting hole 20 has, as shown in FIG. 4, in a position corresponding to the cocoon-shaped portion 18 of the middle diameter shaft portion 7b when being fitted onto the drive shaft 7, a cocoon-shaped hole portion 20a having a substantially same cross-sectional shape as that of the cocoon-shaped portion 18. The cocoon-shaped portion 18 and the cocoon-shaped hole portion 20a are fitted together, thereby restraining a relative rotation between the drive shaft 7 and the impeller 8.

Further, as shown in FIGS. 1, 2 and 4, the fitting hole 20 has, in a position corresponding to the small diameter shaft portion 7c when being fitted onto the drive shaft 7, a circular hole portion 20b whose shape corresponds to a shape of an outer peripheral surface of the small diameter shaft portion 7c. Then, a ring-shaped second stepped portion 21 is provided between the circular hole portion 20b and the cocoon-shaped hole portion 20a of the fitting hole 20 of the impeller 8.

By contact between this second stepped portion 21 of the impeller 8 and the first stepped portion 19 of the drive shaft 7, an axial direction movement of the impeller 8 toward the large diameter shaft portion 7a side is restrained. Further, by a push-nut 22 that is fitted onto and engaged with or fixed to the tip end of the small diameter shaft portion 7c protruding from the front end side of the impeller 8 through the circular hole portion 20b, an axial direction movement of the impeller 8 toward the tip end side of the drive shaft 7 is restrained. With these structures, the impeller 8 is firmly secured to the drive shaft 7.

The mechanical seal 9 is a common seal. As shown in FIGS. 1 and 2, the mechanical seal 9 has a cartridge portion 9a fixed to an inner circumferential surface of the small diameter cylindrical portion 11c of the cylindrical portion 11, a sleeve portion 9b fixed to the outer peripheral surface of the middle diameter shaft portion 7b of the drive shaft 7 and a seal portion 9c provided and sliding between an inner circumferential side of the cartridge portion 9a and an outer circumferential side of the sleeve portion 9b.

As shown in FIGS. 1 and 2, the flange wall 5a of the pulley 5 is provided, at slightly radially outer peripheral side with respect to the middle thereof and at substantially regular intervals in a circumferential direction thereof, with six penetration holes 23 penetrating the flange wall 5a in the axial direction.

Figure 6:
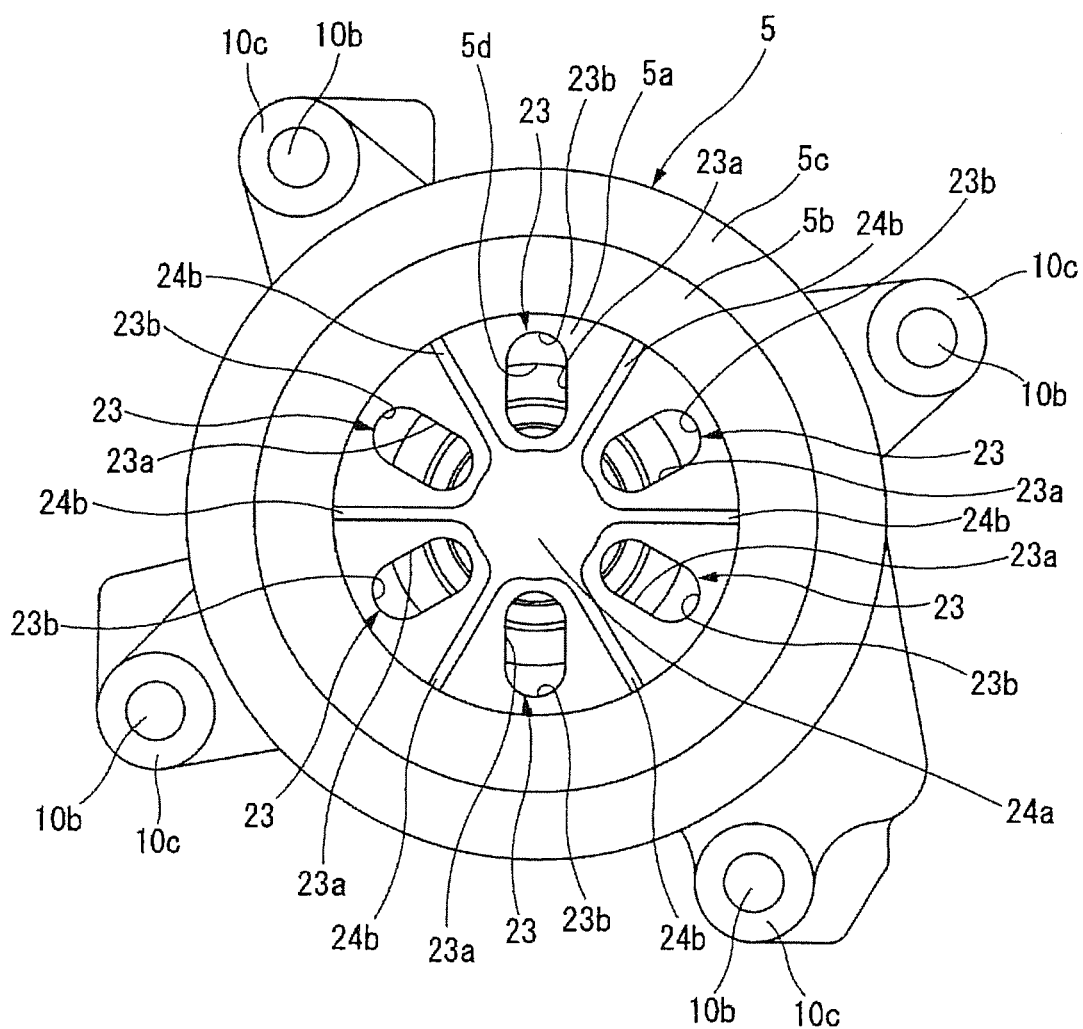
FIG. 6 is a drawing viewed from an arrow B of FIG. 1.

Each penetration hole 23 is shaped into an ellipse (an oval shape) that extends along a radial direction of the flange wall 5a, as can be seen in FIGS. 1, 2 and 6. The penetration hole 23 serves as a work hole for insertion of a press-fitting jig (not shown) when the inner ring 4a of the ball bearing 4 is press-fitted into an outer periphery of the small diameter cylindrical portion 11c of the cylindrical portion 11. The penetration hole 23 also has the function of draining water vapor, which vapors in the drain chamber 13 and reaches an inside of the small diameter cylindrical portion 11c, to the outside.

As shown in FIGS. 1 and 6, a radial direction outermost peripheral portion 23b of an inner peripheral surface 23a of the penetration hole 23 is located at an outer circumferential side with respect to an inner circumferential surface 5d of the cylindrical base portion 5b (with respect to an inner circumferential surface of the body 6a of the insert 6), and thus the outermost peripheral portion 23b is a one-step-lower-stepped surface with respect to the inner circumferential surface 5d. That is, the outermost peripheral portion 23b is located at an outer peripheral side of the flange wall 5a with respect to the ball bearing 4.

Further, the flange wall 5a is provided with a stiffening rib 24 formed integrally with the flange wall 5a to increase rigidity of the pulley 5. As shown in FIGS. 1, 2 and 6, the stiffening rib 24 has a protruding portion 24a having a column shape that protrudes from a radial direction middle position of an outer surface of the flange wall 5a and six extending portions 24b that extend in the radial direction from an outer peripheral edge of the protruding portion 24a to the outer peripheral edge of the flange wall 5a.

The extending portions 24b are formed, as shown in FIG. 6, at substantially regular intervals in a circumferential direction of the flange wall 5a in positions where rotational phases of the six extending portions 24b are shifted by 30 degrees so as not to interfere with the six penetration holes 23. That is, the penetration holes 23 and the extending portions 24b are alternately arranged at uniform intervals in the circumferential direction.

As previously mentioned, the pulley 5 and the drive shaft 7 are molded integrally with each other with the synthetic resin material containing the glass fiber 25 that is a reinforcing fiber material. Therefore, the glass fiber 25 universally exists inside the pulley 5 and the drive shaft 7.

The glass fiber 25 is oriented with a certain orientation for each portion or section inside the pulley and the drive shaft 7. For instance, the glass fiber existing close to sections where the synthetic resin material contacts the mold upon molding has a tendency to be oriented in a flow direction of the synthetic resin material, while a glass fiber 25a existing around the penetration hole 23 of the flange wall 5a has a tendency to be oriented at random by employing an after-mentioned specific molding method (see arrows in FIGS. 11A and 11B).

Figure 11A:
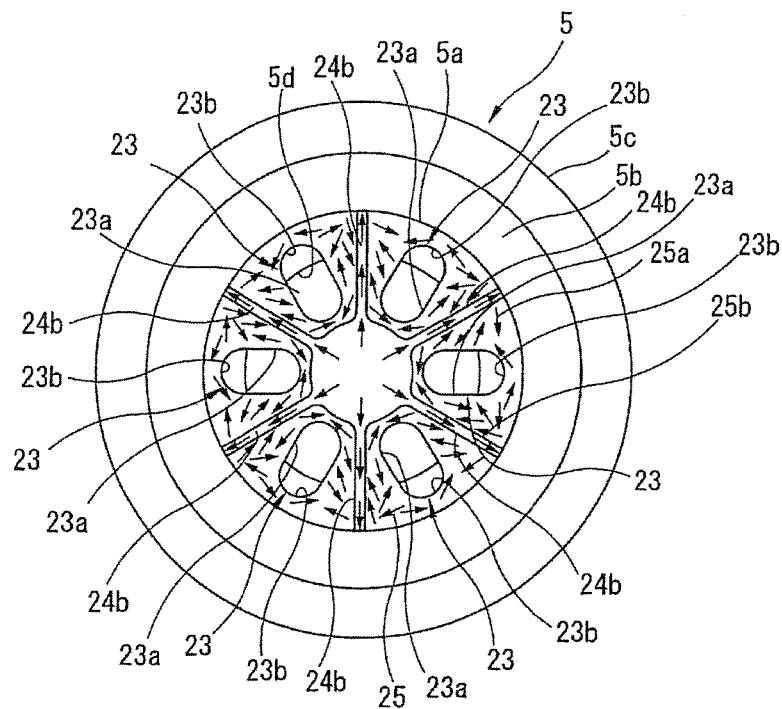
FIGS. 11A to 11B show orientation of reinforcing fiber material in the pulley according to the first embodiment.

Further, as for the glass fiber existing at a stiffening rib 24 side, since the glass fiber existing at the stiffening rib 24 side is not affected by the specific molding method, as shown in FIG. 11A, a glass fiber 25b existing around a surface of the extending portion 24b is oriented in the radial direction of the flange wall 5a along the flow direction of the synthetic resin material.

[Molding Method of Pulley and Drive Shaft (Method for Manufacturing Water Pump)]

A resin molding method of the pulley 5 and the drive shaft 7 will be explained below with reference to FIGS. 7A, 7B and 7C to FIGS. 11A and 11B.

First, a mold 26 for the resin molding and a boring jig (or a hole-opening jig) 27 for forming each penetration hole 23 upon molding by the mold 26 will be briefly explained.

Figure 7A:
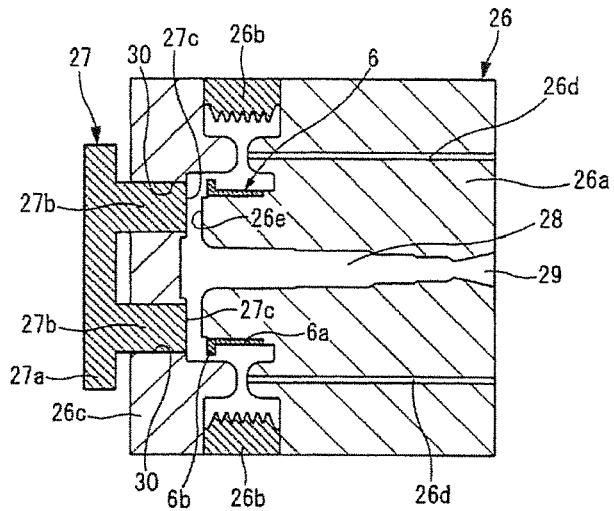
FIGS. 7A to 7C show molding processes of a pulley and the drive shaft with resin material, according to the first embodiment.

The mold 26 is a mold for resin-molding the pulley and the drive shaft 7 integrally with each other. As shown in FIG. 7A, the mold 26 has a first mold 26a for mainly molding the drive shaft 7, two semi-arc second molds 26b, 26b for molding an outer peripheral surface of the belt attaching portion 5c of the pulley 5, which are disposed on both sides at one end portion of the first mold 26a, and a third mold 26c for mainly molding the flange wall 5a etc. of the pulley 5, which is disposed at the one end portion of the first mold 26a on outer end sides of the second molds 26b, 26b.

Figure 8A:
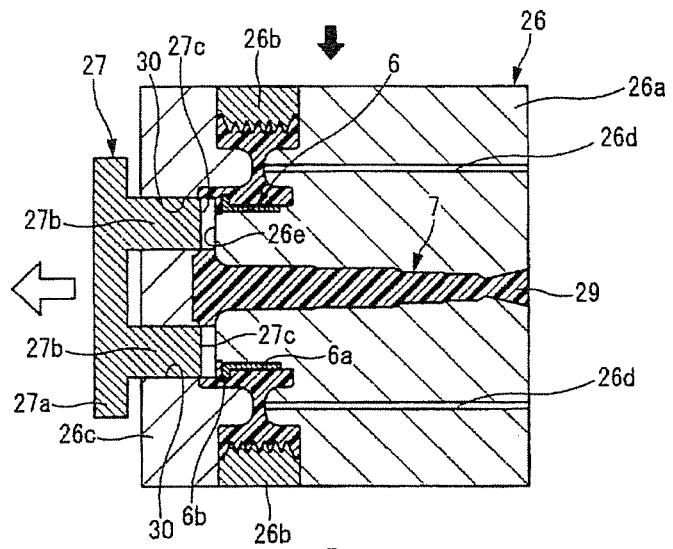
FIGS. 8A to 8C show a process in which the pulley and the drive shaft molded by the resin molding are taken out.
Figure 8B:
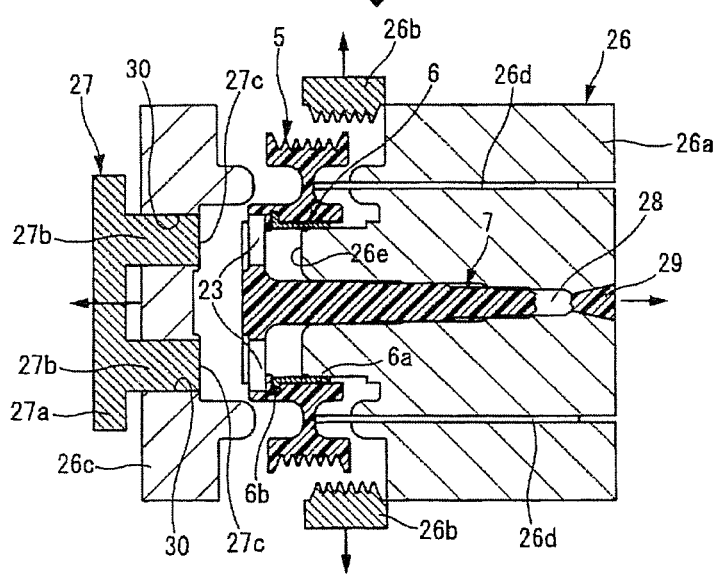
Figure 8C:
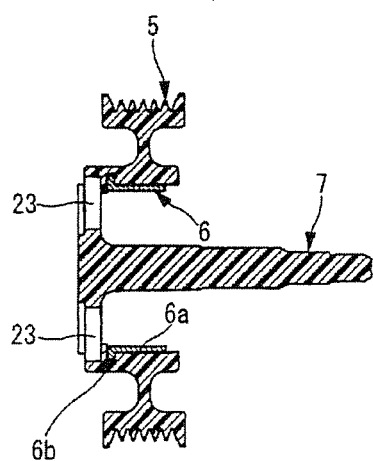

The mold 26 has such a structure that, in a clamping (or pressing) state as shown in FIG. 7A, a cavity 28 is defined inside the mold 26, and as shown in FIG. 8B, the first mold 26a and the third mold 26c are moved and separated in right and left directions in the drawing and also the second molds 26b, 26b are moved and separated in up and down directions in the drawing, then the mold 26 is opened.

Further, the first mold 26a has, on a right hand side thereof in FIG. 7A, a trumpet-shaped (or horn-shaped) injection port 29 through which the synthetic resin material melted by heat application is injected into the cavity 28 from the outside of the mold 26.

The first mold 26a also has a plurality of ejector pins 26d extending along a right and left axial direction in FIG. 7A. The molded pulley 5 and drive shaft 7 are then pushed out to a left hand side in the drawing, and are removed from a surface of the first mold 26a.

Figure 9:
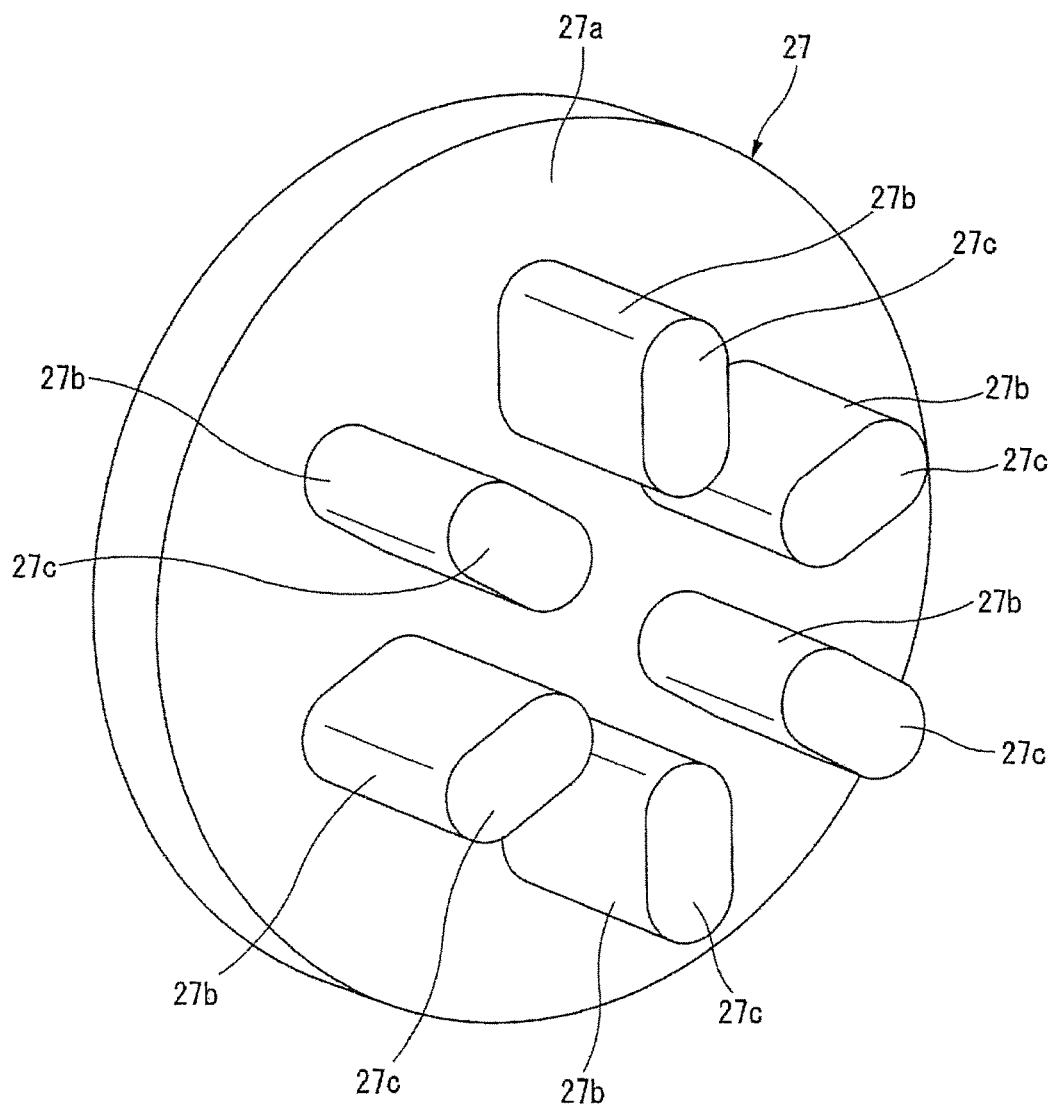
FIG. 9 is a perspective view of the press pins (or the push-out pins) used for the resin molding.

The boring jig 27 has, as shown in FIG. 9, a disc-shaped base portion 27a and six press pins (or push-out pins) 27b protruding from one end side of the base portion 27a.

The press pins 27b are arranged at substantially regular intervals in a circumferential direction of the base portion 27a in substantially radially middle positions of the base portion 27a. A shape in cross-section of each press pin 27b is an ellipse (an oval shape) that extends along a radial direction of the base portion 27a.

A top end surface 27c of the press pin 27b is formed into a surface that is substantially parallel to the one end side of the base portion 27a. Therefore, all of the top end surfaces 27c of the press pins 27b are substantially situated in the same plane (in one plane).

The third mold 26c has, as shown in FIG. 7A, six insertion holes 30 penetrating the third mold 26c, in order for the six press pins 27b of the boring jig 27 to be inserted into the cavity 28. An outside shape of the insertion hole 30 has a substantially same ellipse (oval shape) as the press pin 27b. The six insertion holes 30 are arranged in positions corresponding to the respective press pins 27b. An outer peripheral surface of the press pin 27b is in sliding contact with an inner peripheral surface of the insertion hole 30.

With these structures, the boring jig 27 moves along the right and left direction in the drawing through the insertion holes 30 and the press pins 27b when a driving force acts on the boring jig 27 by a hydraulic cylinder etc. (not shown).

The insertion holes 30 are arranged in positions where rotational phases of the insertion holes 30 are shifted by 30 degrees with respect to portions corresponding to the extending portions 24b of the stiffening rib 24 in the cavity 28.

Next, the resin molding in each process by the mold 26 will be explained with reference to FIGS. 7A, 7B and 7C and FIGS. 8A, 8B and 8C.

FIG. 7A shows a state before the cavity 28 of the mold 26 is filled with the molten synthetic resin material. In this state, the mold 26 is in the clamping state, and the top end surface 27c of each press pin 27b is located in a position (an initial position) corresponding to the outer surface of the flange wall 5a of the pulley 5 in the cavity 28.

Here, the insert 6 is previously fitted and disposed in the cavity 28 of the first mold 26a before the clamping.

Figure 7B:
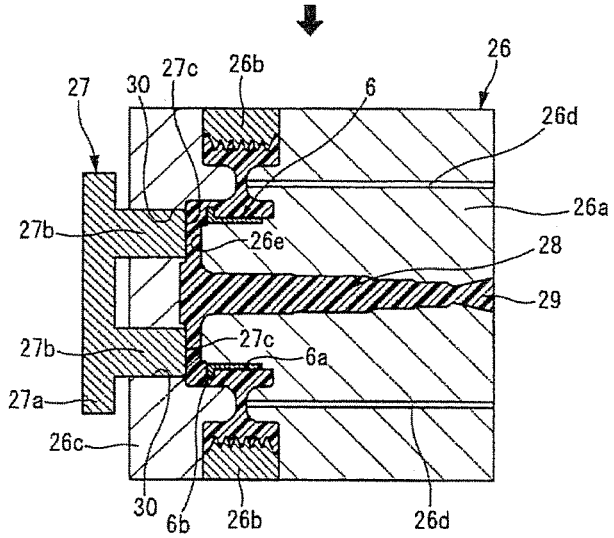

First, as a first process, as shown in FIG. 7B, the molten synthetic resin material containing the glass fiber 25 is injected into the cavity 28 through the injection port 29 of the closed mold 26. The synthetic resin material injected through the injection port 29 flows to the left hand side in the drawing. And when the synthetic resin material reaches the third mold 26c, the synthetic resin material flows to the up and down directions, then the whole cavity 28 is filled with the synthetic resin material.

That is, when the injected molten synthetic resin material flows along the axial direction and reaches a position corresponding to a connecting portion between the large diameter shaft portion 7a of the drive shaft 7 and the flange wall 5a of the pulley 5, the molten synthetic resin material continuously flows in the radial direction toward a position corresponding to an outer peripheral edge of the belt attaching portion 5c of the pulley 5, then the whole cavity 28 is filled with the synthetic resin material.

Figure 10:
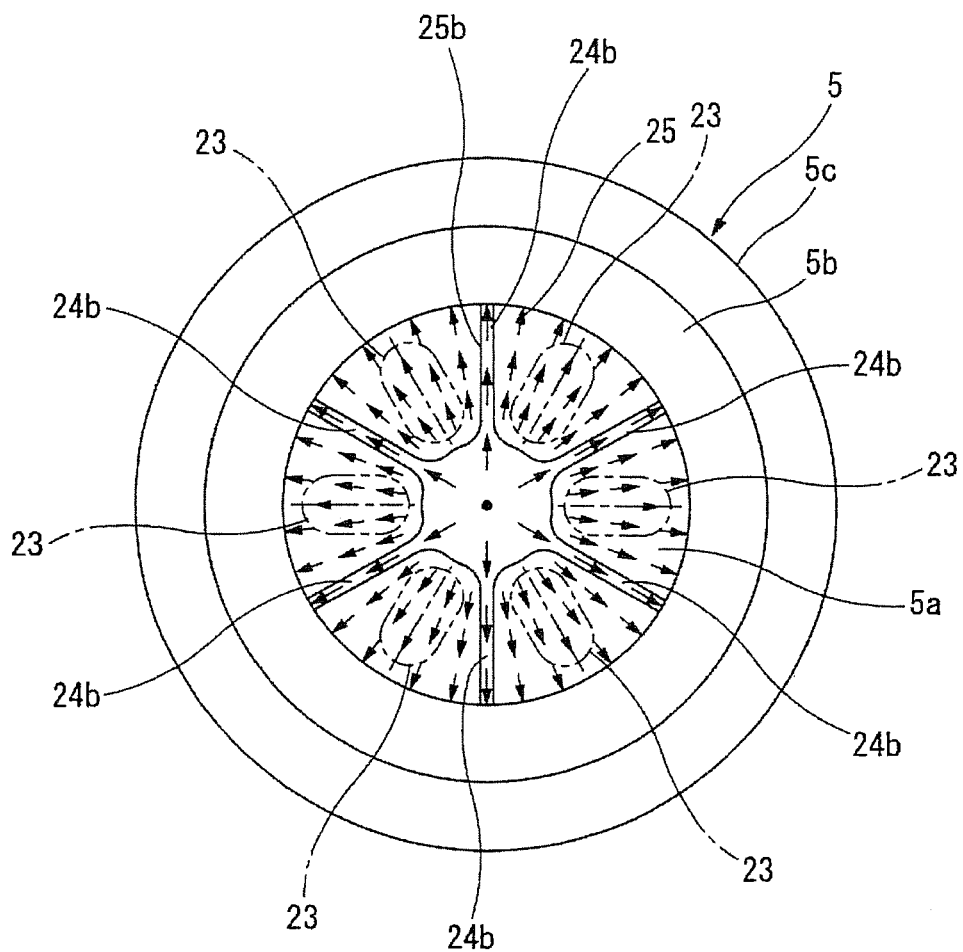
FIG. 10 is a front view of the pulley, showing orientation of reinforcing fiber material in the pulley after the first process of the resin molding.

At this time, the glass fiber 25 mixed in the synthetic resin material, which exists in sections or portions where the synthetic resin material contacts the mold 26, has a tendency to be oriented in the flow direction of the synthetic resin material. Therefore, the glass fiber 25 existing around a surface of the section corresponding to the flange wall 5a at this time is oriented substantially along the radial direction from a middle position of the flange wall 5a, including the stiffening rib 24, as shown in FIG. 10.

Figure 7C:
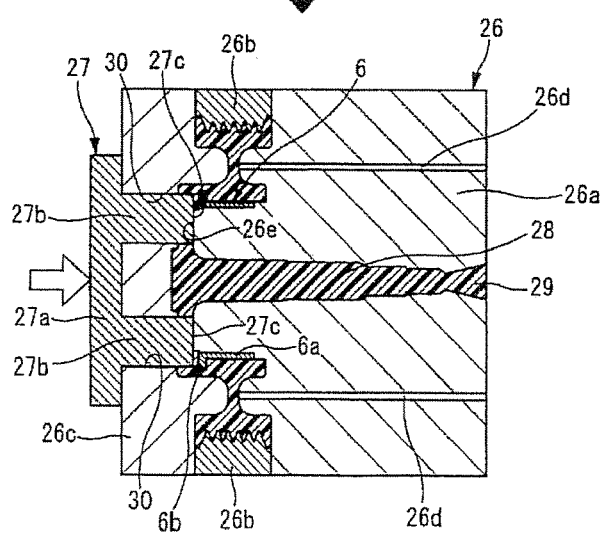

Next, as a second process, as shown in FIG. 7C, at a certain timing by the time when the synthetic resin material hardens after completion of the filling of the synthetic resin material, the penetration holes 23 are formed on the flange wall 5a of the pulley 5 by the boring jig 27.

That is, by moving the boring jig 27 to the right side in the drawing by the hydraulic cylinder etc., each press pin 27b is pressed and inserted into an inside of the semi-solid (medium consistency) synthetic resin material until each top end surface 27c of the press pin 27b contacts a flat contact surface 26e (a position corresponding to an inner surface of the flange wall 5a in the cavity 28) of the first mold 26a.

Then, this state in which the top end surface 27c of the press pin 27b contacts the flat contact surface 26e is maintained until the synthetic resin material filling the cavity 28 completely hardens. With this, the pulley 5 and the drive shaft 7 are formed integrally with each other, and at the same time, each penetration hole 23 is formed on the flange wall 5a of the pulley 5.

Figure 11B:
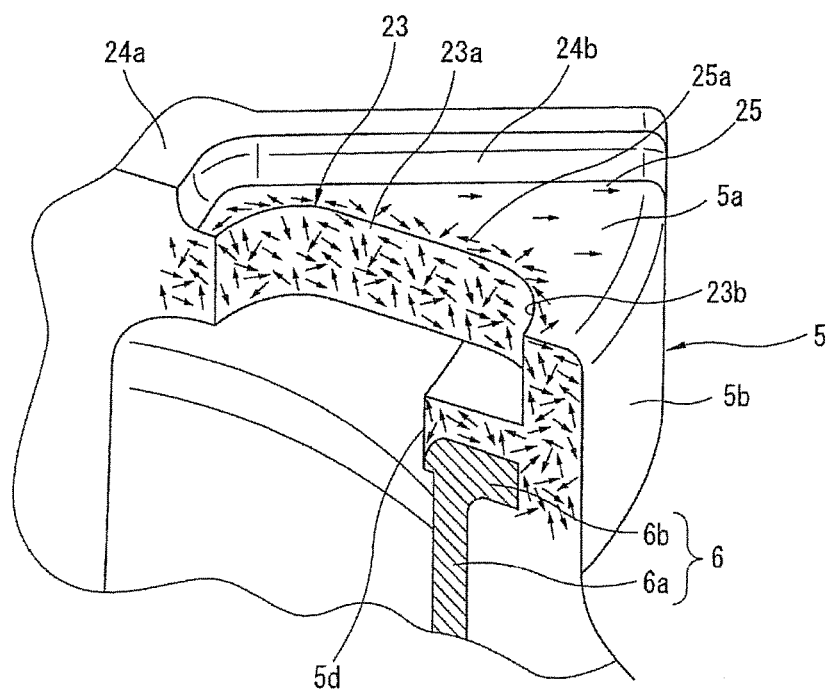

Upon the molding, since the glass fiber 25a existing around the penetration hole 23 is pressed and extruded to an outer peripheral side of the top end surface 27c by the top end surface 27c of the press pin 27b, as shown by arrows in FIGS. 11A and 11B, the glass fiber 25a existing around the penetration hole 23 is not oriented in a specific direction, namely that the glass fiber 25a existing around the penetration hole 23 is oriented at random.

Further, since the synthetic resin material extruded by the press pins 27b is in the semi-solid state, most of the synthetic resin material gather around each penetration hole 23 without widely flowing, and completely harden here. Therefore, the glass fiber 25 oriented in areas (see dashed lines in FIG. 10) where the penetration holes 23 are formed also remains around each penetration hole 23 although the glass fiber 25 slightly flows. Accordingly, as shown in FIGS. 11A and 11B, density of the glass fiber 25a existing around the penetration hole 23 increases.

Here, as for the glass fiber 25 oriented inside the stiffening rib 24, since the extending portion 24b has a convex shape and protrudes from the flange wall 5a, the glass fiber 25 inside the stiffening rib 24 is not subject to the random orientation. Thus, as shown in FIG. 11A, the glass fiber 25b existing around the surface of the extending portion 24b is oriented in the radial direction from the middle position of the flange wall 5a, which is not changed from a state immediately after the synthetic resin material is filled (see FIG. 10).

Next, as a third process, as shown in FIG. 8A, after the synthetic resin material filling the cavity 28 completely hardens, the boring jig 27 is returned to the initial position shown at left side in the drawing.

Subsequently, as a fourth process, as shown in FIG. 8B, after the mold 26 is opened, the synthetic resin material remaining in the injection port 29 is removed from the drive shaft 7. Further, the pulley 5 and drive shaft 7 are pushed out to the left hand side in the drawing by the ejector pins 26d, and taken out from the first mold 26a. A series of resin-molding is then completed (see FIG. 8C).

[Comparison in Effect Between the Related Art and the Present Embodiment]

As a molding method of the penetration holes of the related art water pump, a method in which cores having shapes corresponding to the respective penetration holes are previously disposed in the mold then the penetration holes are formed simultaneously with the filling of the synthetic resin material is used. Or alternatively, a method in which the penetration holes are formed by drilling after molding the water pump is used. However, in a case where the pulley of the water pump is formed with the synthetic resin material containing the glass fiber 25, there is a risk that a sufficient strength of the pulley is not secured.

Figure 12A:
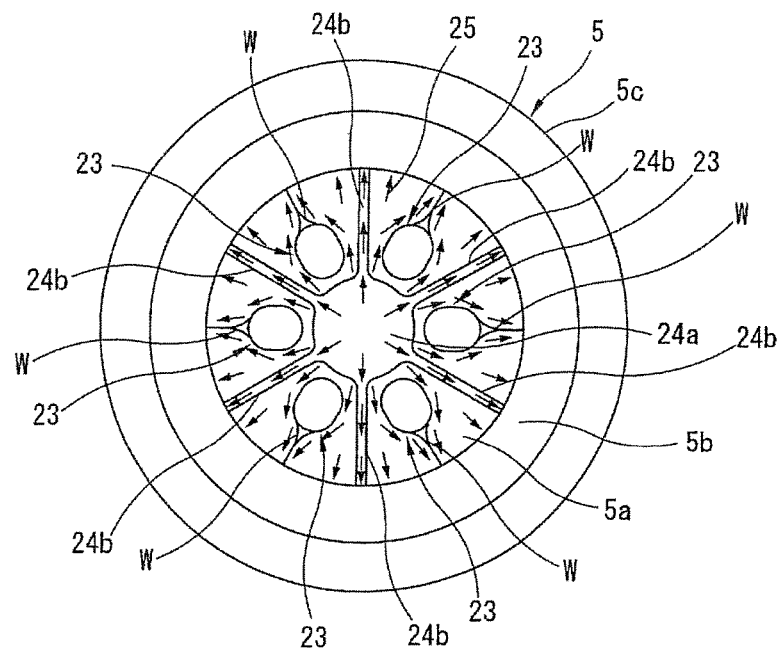
FIGS. 12A to 12B show orientation of reinforcing fiber material in the pulley in a case where penetration holes are formed simultaneously with filling of the resin material in the related art.
Figure 12B:
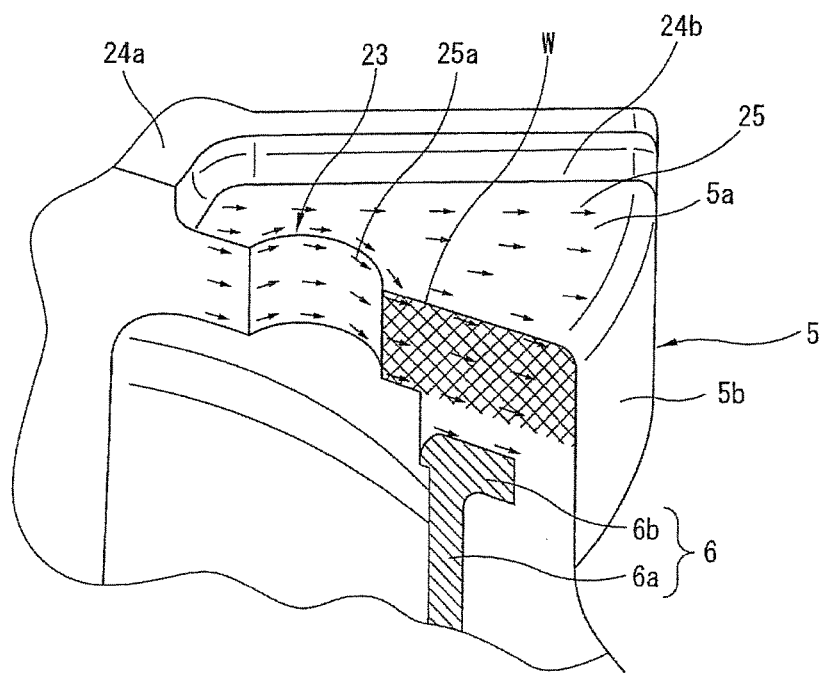

More specifically, in a case where the penetration hole 23 of the pulley 5 is formed by the former molding method as shown in FIGS. 12A and 12B, a glass fiber 25a existing around the penetration hole 23 of the flange wall 5a is oriented almost uniformly in the radial direction of the flange wall 5a, and especially at an outer radial side of the flange wall 5a with respect to the penetration hole 23, a so-called weld line W is generated when the synthetic resin material having flown separately to outer peripheral both sides of the core joins. Because of this, there is a risk of decreasing the strength of the pulley 5.

Figure 13A:
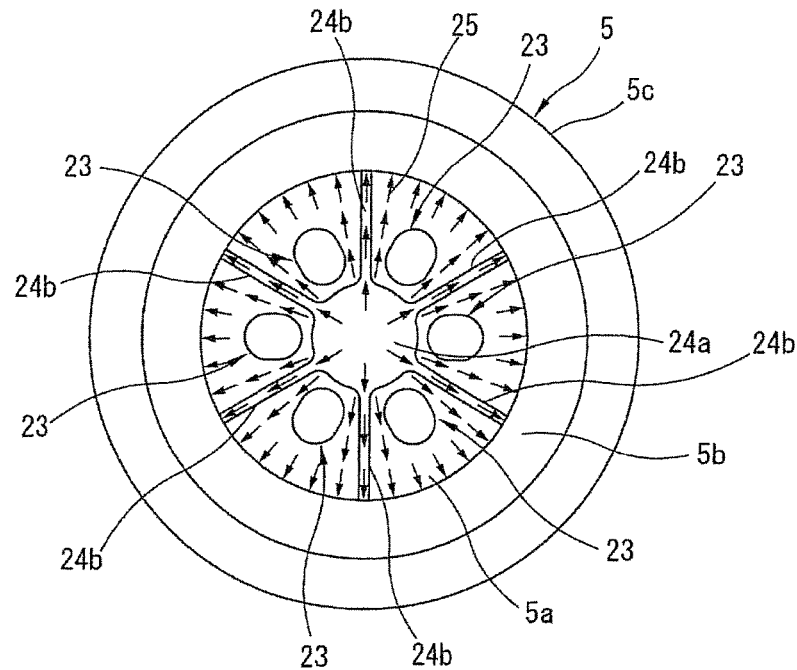
FIGS. 13A to 13B show orientation of reinforcing fiber material in the pulley in a case where the penetration holes are formed after the pulley is molded in the related art.
Figure 13B:
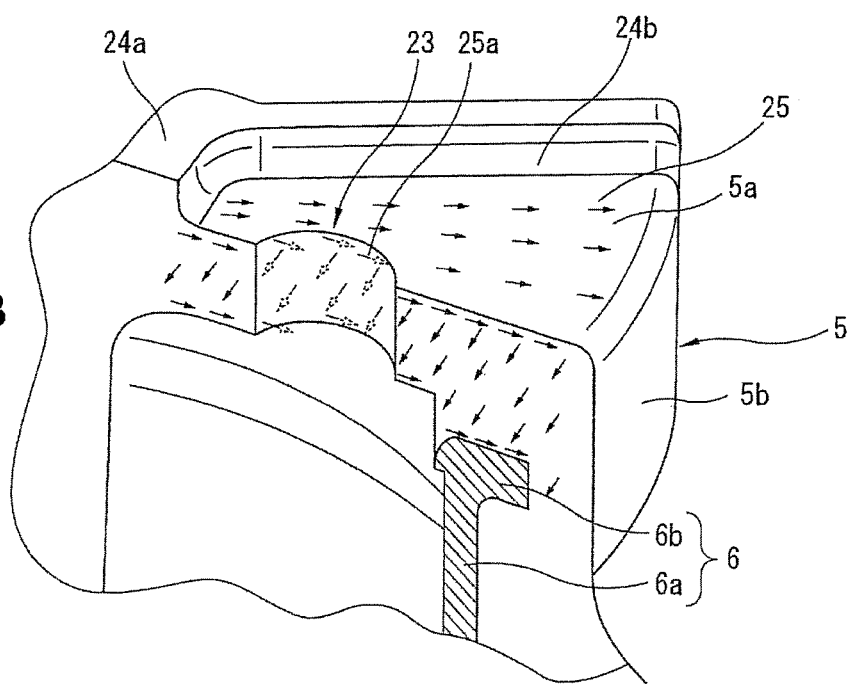

Further, in a case where the penetration hole 23 of the pulley 5 is formed by the latter molding method as shown in FIGS. 13A and 13B, although the weld line W is not generated inside the flange wall 5a around the penetration hole 23, as shown in FIG. 13B, since each penetration hole 23 is formed by drilling or cutting, the glass fiber 25a around the penetration hole 23 of the flange wall 5a is cut. Thus, this case also involves the same risk of decreasing the strength of the pulley 5.

In contrast to these cases, in the present embodiment, since the glass fiber 25a existing around the penetration hole 23 is oriented at random, the weld line W is not generated and the glass fiber 25a around the penetration hole 23 is not cut. In addition, because of the random orientation, the glass fiber 25a existing around the penetration hole 23 is firmly connected together by a reticulated or mesh or net-shaped structure.

Hence, according to the present embodiment, it is possible to surely suppress the decrease in the strength of the flange wall 5a around the penetration hole 23.

Further, in the present embodiment, at a certain timing by the time when the synthetic resin material hardens after completion of the filling of the synthetic resin material, the penetration holes 23 are formed by a pressing force of the boring jig 27 by pressing or extruding the semi-solid (medium consistency) synthetic resin material. Therefore, density of the resin around the penetration hole 23 and density of the glass fiber 25a increase, and thereby greatly increasing the strength of the pulley 5 around the penetration hole 23.

Moreover, in the present embodiment, since the stiffening rib 24 is formed integrally with the flange wall 5a at the outer surface of the flange wall 5a, the strength of the pulley 5 is further increased. In particular, since each extending portion 24b extending in the radial direction from the substantially middle position of the flange wall 5a is formed, the strength in the radial direction of the pulley 5 is greatly increased.

Furthermore, the glass fiber 25b existing around the surface of the extending portion 24b is oriented in the radial direction of the flange wall 5a without being subject to the random orientation, and this oriented glass fiber 25b beats a radial direction force. The strength in the radial direction of the pulley 5 is further increased.

In addition, since the penetration holes 23 and the extending portions 24b of the stiffening rib 24 are arranged at regular intervals at the flange wall 5a, it is possible to increase the strength of the pulley 5 uniformly.

In the present embodiment, as described above, the pulley 5 and the drive shaft 7 are resin-molded integrally with each other using the mold 26 having the injection port 29 in a position corresponding to a tip end surface of the drive shaft 7.

Upon the resin molding, when the synthetic resin material flows and reaches the connecting portion between the drive shaft 7 and the pulley 5 in the cavity 28 of the mold 26, the synthetic resin material having flown along the axial direction flows so as to expand in the radial direction. The glass fiber 25 is then oriented so as to follow the resin flow between the drive shaft 7 and the pulley 5. Connecting strength between the drive shaft 7 and the pulley 5 is therefore increased.

In the present embodiment, since the penetration holes 23 are formed at regular intervals in the circumferential direction of the flange wall 5a, it is possible to promptly drain and eject water and dust entering the inside of the cylindrical base portion 5b independent of rotational position of the pulley 5.

Further, in the present embodiment, the penetration holes 23 are formed by pressing the press pins 27b from the outer surface side toward the inner surface side of the flange wall 5a and penetrating the flange wall 5a upon the resin-molding. Thus, as compared with a case where the penetration holes 23 are formed by pressing the press pins 27b from the inner surface side toward the outer surface side of the flange wall 5a, relatively large diameter penetration holes 23 can be formed without constraints of an inside diameter of the cylindrical base portion 5b.

With this, the radial direction outermost peripheral portion 23b of the inner peripheral surface 23a of the penetration hole 23 is formed into the one-step-lower-stepped surface with respect to the inner circumferential surface 5d of the cylindrical base portion 5b, i.e. with respect to an outer circumferential surface position of the outer ring 4b of the bearing 4. Therefore, the water and the dust entering the inside of the cylindrical base portion 5b are guided through the inner peripheral surface 23a of the penetration hole 23 and promptly drained or ejected to the outside. Performance or function of the drain and ejection is thus improved.

In addition, the insert 6 press-fitted onto the inner circumferential surface 5d of the cylindrical base portion 5b is in a high temperature condition due to transmission of heat generated at the ball bearing 4 during an engine operation. At this time, the water entering the inside of the cylindrical base portion 5b vapors by contact with the high-temperature insert 6, and is expelled or exhausted to the outside through the penetration hole 23.

That is, in the present embodiment, since heat accumulated in the metal-made insert 6 is used for drain (or exhaust) of the water entering the inside of the cylindrical base portion 5b, performance or function of the drain (or exhaust) is further improved.

Hence, according to the present embodiment, the water and the dust entering the inside of the cylindrical base portion 5b do not flow to the ball bearing 4 side. It is therefore possible to greatly suppress the formation of rust at the ball bearing 4.

FIGS. 14 to 17 show the penetration holes 23 according to other embodiments.

Second Embodiment

Figure 14:
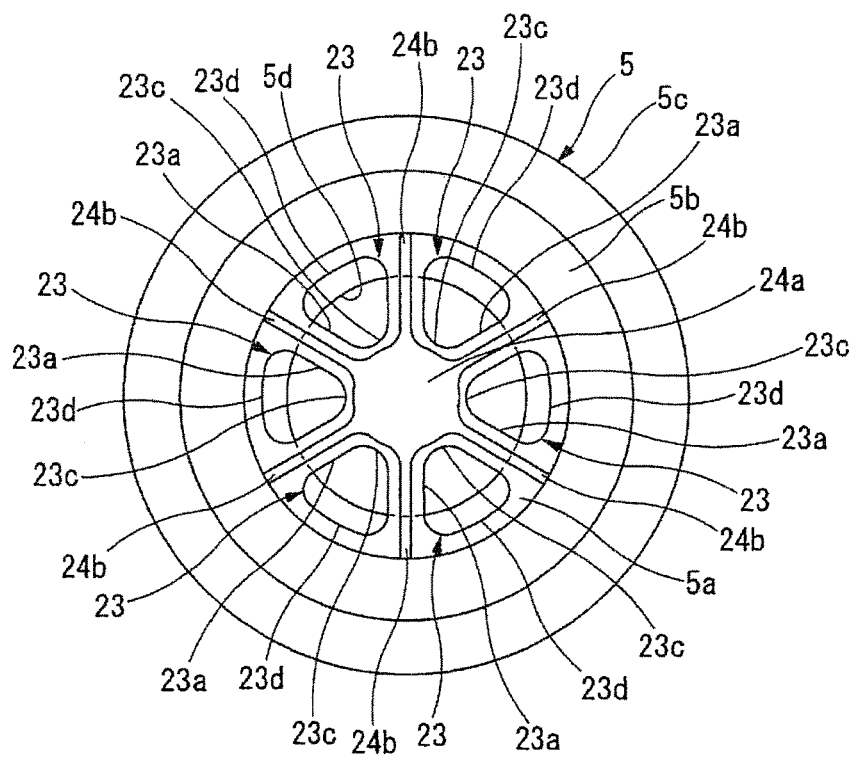
FIG. 14 is a front view of the pulley according to a second embodiment.

As shown in FIG. 14, an inner peripheral surface 23a of each penetration hole 23 of a second embodiment is shaped into a substantially triangle having round-corners. More specifically, the penetration hole 23 is formed so that a top surface 23c of the penetration hole 23 points toward a center of the flange wall 5a and a circumferential direction length of the top surface 23c widens from the top surface 23c toward a bottom surface 23d located at the outer peripheral side of the flange wall 5a.

Further, the bottom surface 23d of each penetration hole 23 is located at an outer side with respect to a position of the inner circumferential surface 5d of the cylindrical base portion 5b of the flange wall 5a, namely that the bottom surface 23d is formed into the one-step-lower-stepped surface with respect to the position of the inner circumferential surface 5d.

Therefore, according to the present embodiment, in addition to the same effects as those of the first embodiment, the water entering the inside of the cylindrical base portion 5b is guided through the widely-opened one-step-lower-stepped surface of the bottom surface 23d of the penetration hole 23 and drained or ejected to the outside. As a consequence, a flow speed (or flow velocity) of the drain is increased, then performance or function of the drain and ejection is further improved.

Third and Fourth Embodiment

Figure 15:
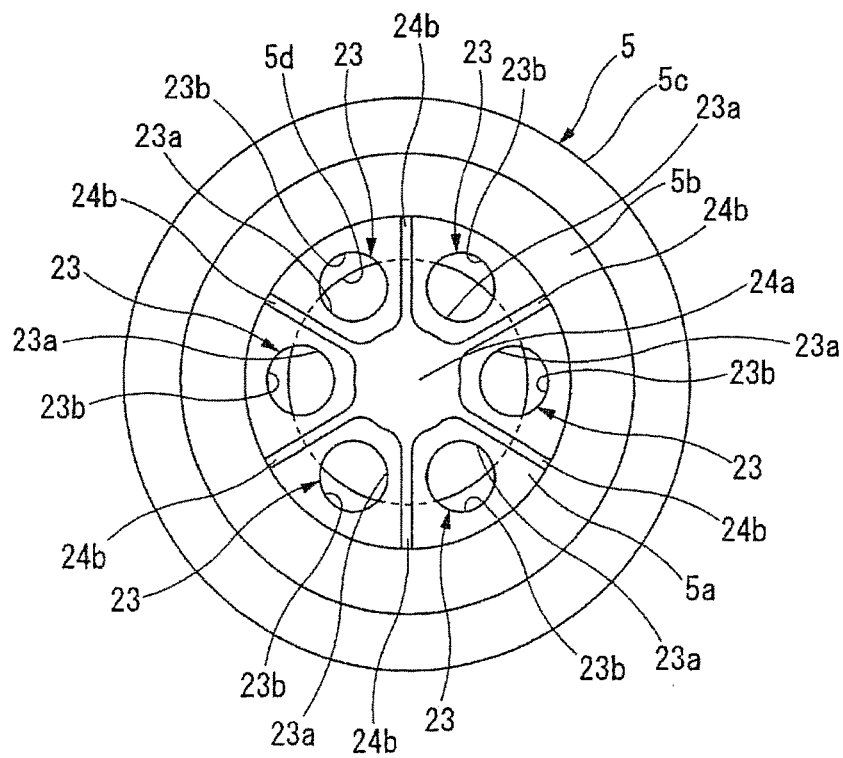
FIG. 15 is a front view of the pulley according to a third embodiment.

As shown in FIG. 15, the inner peripheral surface 23a of each penetration hole 23 of a third embodiment is shaped into a circular shape. More specifically, the outermost peripheral portion 23b of the inner peripheral surface 23a is located at the outer circumferential side with respect to the inner circumferential surface 5d of the cylindrical base portion 5b of the flange wall 5a.

Figure 16:
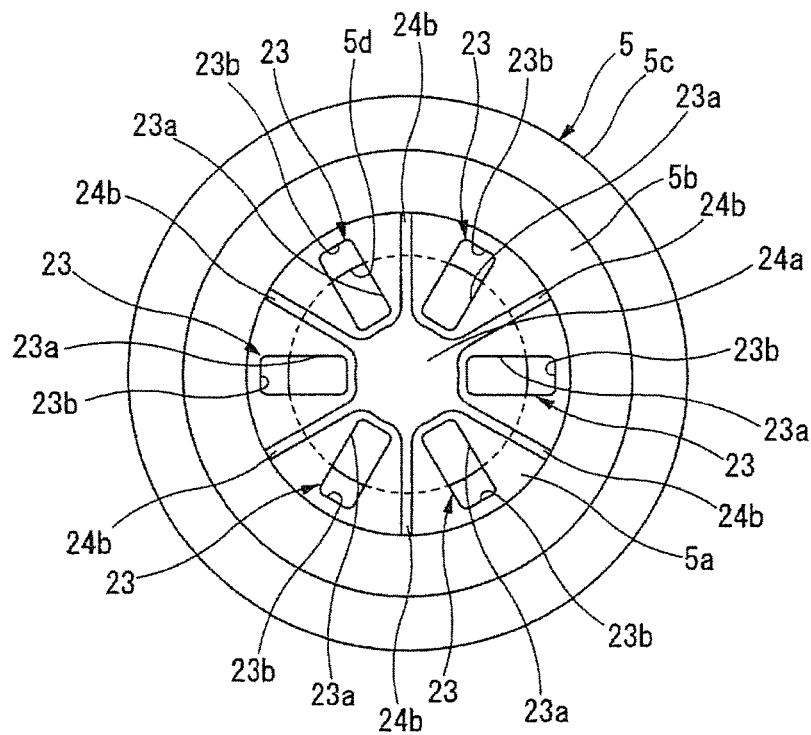
FIG. 16 is a front view of the pulley according to a fourth embodiment.

As shown in FIG. 16, the inner peripheral surface 23a of each penetration hole 23 of a fourth embodiment is shaped into a rectangular shape whose longitudinal side is the radial direction of the flange wall 5a. More specifically, the outermost peripheral portion 23b of the inner peripheral surface 23a is located at the outer circumferential side with respect to the inner circumferential surface 5d of the cylindrical base portion 5b of the flange wall 5a.

Therefore, the third and fourth embodiments can also obtain the same effects as those of the first embodiment.

Fifth Embodiment

Figure 17:
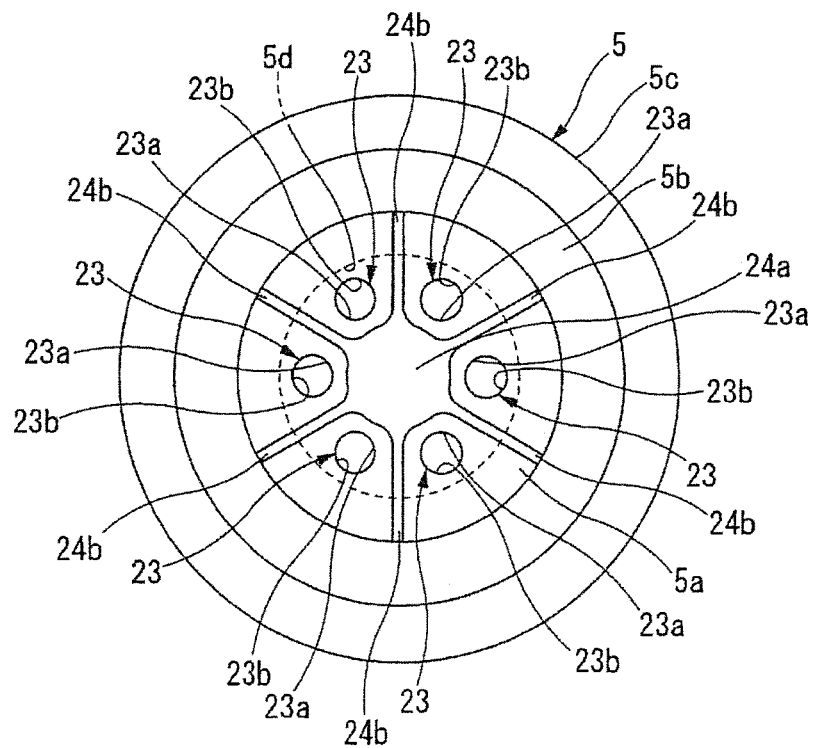
FIG. 17 is a front view of the pulley according to a fifth embodiment.

As shown in FIG. 17, the inner peripheral surface 23a of each penetration hole 23 of a fifth embodiment is shaped into a circular shape. However, a diameter of the penetration hole 23 is smaller than that of the third embodiment. Further, as for position of the penetration hole 23, it is shifted to an inner circumferential side of the flange wall 5a as compared with the other embodiments.

That is, each penetration hole 23 is positioned and has an inside diameter required to serve as a function of inserting the press-fitting jig for press-fitting the ball bearing 4, as a work hole.

In the present embodiment, because of the small diameter of the penetration hole 23, it is possible to suppress the entry of the water and the dust from the outside. As for the water entering the inside of the cylindrical base portion 5b, since the water vapors by the heat accumulated in the metal-made insert 6 and is expelled or exhausted to the outside through the penetration hole 23. Thus, performance or function of the drain (or exhaust) is not impaired.

Further, a great pressing force is required to press or extrude the semi-solid synthetic resin material when resin-molding the penetration hole 23. However, in the present embodiment, since the diameter of the penetration hole 23 is small, the boring jig 27 requires only a relatively small pressing force. It is thus possible to easily form the penetration hole 23.

Here, in the present embodiment, since the outermost peripheral portion 23b of the inner peripheral surface 23a of the penetration hole 23 is located at an inner circumferential side with respect to the inner circumferential surface 5d of the cylindrical base portion 5b of the flange wall 5a, the penetration hole 23 could be formed by sliding the press pin 27b of the boring jig 27 from the inner surface side toward the outer surface side of the flange wall 5a.

The present invention is not limited to the above embodiments, and includes all design modifications and equivalents belonging to the technical scope of the present invention.

For instance, in each embodiment, by the above molding method, the pulley 5 and the drive shaft 7 are formed and also the glass fiber 25a existing around the penetration hole 23 of the flange wall 5a is oriented at random. However, the molding method is not limited to this.

Further, in the embodiments, the pulley 5 and the drive shaft 7 are integrally molded with each other. However, these pulley 5 and drive shaft 7 could be molded separately.

In addition, in the embodiments, containing the glass fiber 25, which is the reinforcing material, in the synthetic resin material increases the rigidity of the pulley 5 and the drive shaft 7. However, this reinforcing material is not limited as long as the reinforcing material can be mixed in the synthetic resin material. For instance, carbon fiber could be used.

In the embodiments, providing the stiffening rib 24 at the outer surface side of the flange wall 5a increases the rigidity of the pulley 5. However, this stiffening rib 24 could be formed at the inner surface side of the flange wall 5a. Further, the stiffening rib 24 might be formed on the both inner and outer surfaces of the flange wall 5a.

Moreover, each penetration hole 23 could be formed by combining the penetration holes 23 of the above embodiments.

The invention claimed is:

1. A water pump comprising:
a pump housing having therein a pump chamber;
a drive shaft rotatably supported in the pump housing;
a pulley having a disk-shaped flange wall fixed to one end portion of the drive shaft, the pulley being formed integrally with the drive shaft with synthetic resin material containing reinforcing fiber material; and
an impeller secured to an other end portion of the drive shaft so as to be able to rotate integrally with the drive shaft, the impeller being accommodated in the pump chamber, and wherein
the disk-shaped flange wall of the pulley has a plurality of penetration holes that connect inner and outer sides of the disk-shaped flange wall, and the reinforcing fiber material existing around the plurality of penetration holes has random orientation.

2. The water pump as claimed in claim 1, further comprising:
a stiffening rib formed integrally with the disk-shaped flange wall and having a protruding portion that protrudes from a radial direction middle position of the disk-shaped flange wall and a plurality of extending portions that extend in a radial direction from an outer peripheral edge of the protruding portion.

3. The water pump as claimed in claim 2, wherein:
the plurality of penetration holes are arranged between the plurality of extending portions in a circumferential direction of the disk-shaped flange wall.

4. The water pump as claimed in claim 3, wherein:
the reinforcing fiber material is a glass fiber.

5. The water pump as claimed in claim 1, wherein:
the pulley has, at an outer peripheral portion of the disk-shaped flange wall, a cylindrical base portion formed integrally with the disk-shaped flange wall,
a bearing unit rotatably supporting the drive shaft is interposed between the cylindrical base portion and the pump housing, and
a radial direction outermost peripheral portion of the plurality of penetration holes is located at a radially outer side of the disk-shaped flange wall with respect to the bearing unit.

6. The water pump as claimed in claim 5, wherein:
the plurality of penetration holes are arranged at regular intervals in a circumferential direction of the disk-shaped flange wall.

7. The water pump as claimed in claim 6, wherein:
the plurality of penetration holes have an oval shape that extends along a radial direction of the disk-shaped flange wall.

8. The water pump as claimed in claim 6, wherein:
the plurality of penetration holes have a shape whose circumferential direction length widens from a middle side of the plurality of penetration holes toward the radially outer side of the disk-shaped flange wall.

9. The water pump as claimed in claim 8, wherein:
the plurality of penetration holes have a triangle shape having round-corners.

10. The water pump as claimed in claim 6, wherein:
the plurality of penetration holes have a circular shape.

11. The water pump as claimed in claim 6, wherein:
the plurality of penetration holes have a rectangular shape.

12. The water pump as claimed in claim 5, wherein:
the bearing unit is a single-unit ball bearing whose inner ring is fixed to the pump housing and whose outer ring is fixed to the cylindrical base portion.

13. A water pump comprising:
a pump housing having, at an axial direction one end side thereof, a cylindrical portion;
a drive shaft rotatably supported in the pump housing, the drive shaft being formed with synthetic resin material containing reinforcing fiber material;
a pulley having a disk-shaped end wall fixed to one end portion of the drive shaft and a cylindrical base portion connected to an outer peripheral edge of the disk-shaped end wall so as to encircle the cylindrical portion, the pulley being formed integrally with the drive shaft with the synthetic resin material containing the reinforcing fiber material;
a cylindrical metal member fixed to an inner periphery of the cylindrical base portion;
a bearing unit interposed between the metal member and the cylindrical portion and rotatably supporting the drive shaft;
an impeller secured to an other end portion of the drive shaft so as to be able to rotate integrally with the drive shaft, the impeller being formed with synthetic resin material containing fiber material; and
a fixing connector fixing the impeller to the drive shaft from the other end side of the drive shaft, and wherein
the disk-shaped end wall of the pulley has a plurality of penetration holes that connect inner and outer sides of the disk-shaped end wall, and the reinforcing fiber material existing around the plurality of penetration holes has random orientation.

14. The water pump as claimed in claim 13, further comprising:

a stiffening rib formed integrally with the disk-shaped end wall and having a protruding portion that protrudes from a radial direction middle position of the disk-shaped end wall and a plurality of extending portions that extend in a radial direction from an outer peripheral edge of the protruding portion, and wherein the plurality of penetration holes are arranged between the plurality of extending portions in a circumferential direction of the disk-shaped end wall.

15. A method for manufacturing a water pump, the water pump having a pump housing, the pump housing having a pump chamber; a drive shaft rotatably supported in the pump housing; a pulley having a disk-shaped flange wall fixed to one end portion of the drive shaft, the pulley being formed integrally with the drive shaft with synthetic resin material containing reinforcing fiber material; and an impeller secured to an other end portion of the drive shaft so as to be able to rotate integrally with the drive shaft, the impeller being accommodated in the pump chamber, and the disk-shaped flange wall of the pulley being provided with a plurality of penetration holes that penetrate the disk-shaped flange wall and connect an inner side and an outer side of the disk-shaped flange wall, the method comprising:

a first process of filling a mold for the pulley with molten synthetic resin material; and a second process of pressing the synthetic resin material by a boring jig and forming the plurality of penetration holes before a time when the synthetic resin material hardens after completion of the first process of filling.

16. The method for manufacturing the water pump as claimed in claim 15, wherein:

in the second process, a press pin provided at the boring jig is pressed into and penetrates the molten synthetic resin material corresponding to the disk-shaped flange wall from an opposite side to the impeller toward an impeller side.

17. The method for manufacturing the water pump as claimed in claim 16, wherein:

the pulley and the drive shaft are molded integrally with each other by filling the mold with the molten synthetic resin material containing the reinforcing fiber material, and an injection port for injecting the molten synthetic resin material is formed at the mold in a position corresponding to a tip end surface of the drive shaft.

18. The method for manufacturing the water pump as claimed in claim 17, wherein:

the press pin has an ellipse shape in cross-section.

* * * * *